United States Patent [19]

Jossier

[11] 3,953,684

[45] Apr. 27, 1976

[54] STATIC MEMORY PULSE TRANSMITTER

[75] Inventor: Patrick Jossier, Paris, France

[73] Assignee: Peritel, Peripheriques de Telephone (S.A.R.L.), Boulogne, France

[22] Filed: Nov. 19, 1974

[21] Appl. No.: 525,109

[30] Foreign Application Priority Data

Nov. 26, 1973 France............................ 73.42024

[52] U.S. Cl. ............................................. 179/90 K
[51] Int. Cl.² ......................................... H04M 1/26
[58] Field of Search............ 179/90 K, 90 R, 90 BB; 340/172.5

[56] References Cited
UNITED STATES PATENTS

| | | | |
|---|---|---|---|
| 3,787,639 | 1/1974 | Battrick | 179/90 K |
| 3,879,584 | 4/1975 | McCabe et al. | 179/90 K |
| 3,881,070 | 4/1975 | McCabe et al. | 179/90 K |

Primary Examiner—Douglas W. Olms
Attorney, Agent, or Firm—Roylance, Abrams, Berdo & Kaul

[57] ABSTRACT

A static memory pulse transmitter for storing coded call numbers and transmitting them on a telephone line including a memory, logic circuits for addressing a specified group of cells in the memory, a keyboard for inserting numbers and instructions, a first counter to accumulate a count for each member insulated on the keyboard to be stored, a second counter incremented at a "dial pulse" rate for numbers to be read out onto the telephone line, and a comparison logic circuit for preventing the rate of incrementing the second counter does not exceed the rate incrementing the first counter.

8 Claims, 11 Drawing Figures

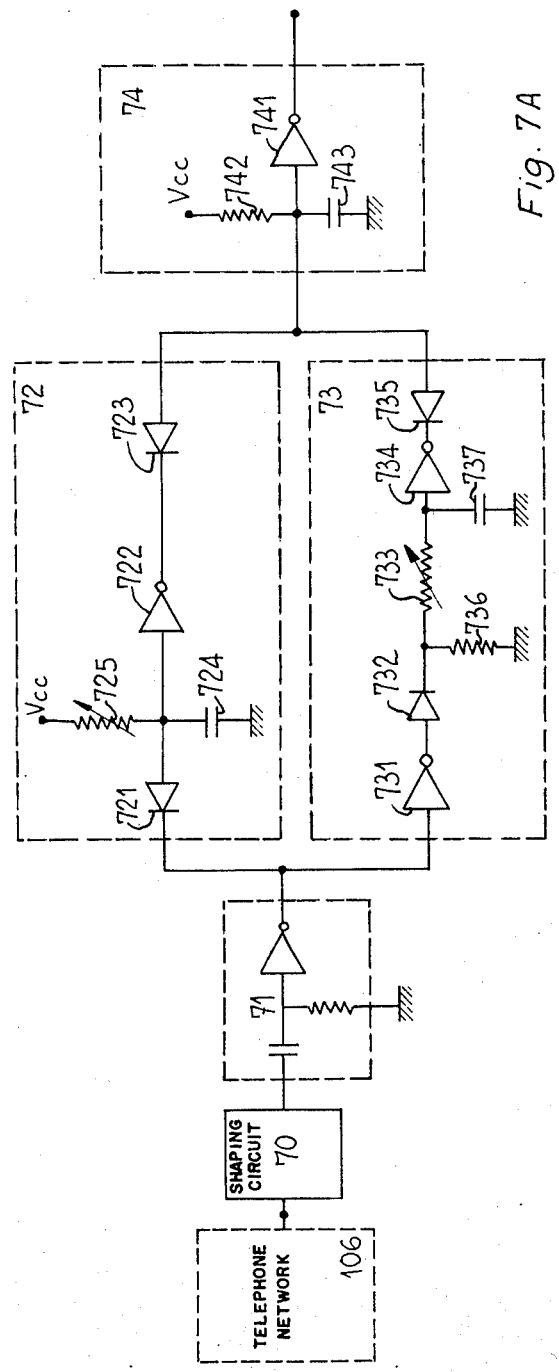
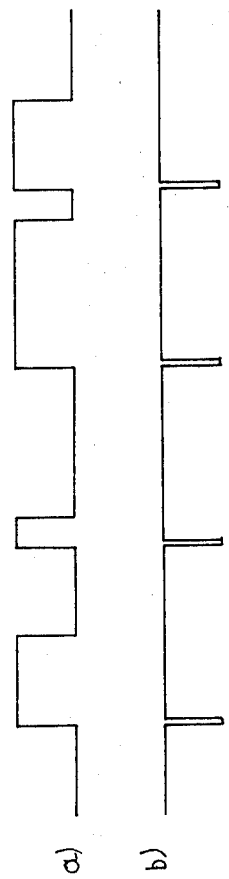
Fig. 7A
Fig. 7B

STATIC MEMORY PULSE TRANSMITTER

FIELD OF THE INVENTION

The invention relates to a static memory pulse transmitter for use in telephony.

A memory pulse transmitter for use in telephony is an apparatus for replacing a telephonic impulse dial for permitting call numbers to be stored and coded in a simple manner.

SUMMARY OF THE INVENTION

An object of the invention is to provide such a memory pulse transmitter which is very cheap.

Another object of the invention is to provide a static memory pulse transmitter which can proceed simultaneously to the transmission and to the storing of a call number.

Another object of the invention is to provide a memory pulse transmitter comprising an automatic detection of the availability tone.

A further object of the invention is to provide a memory pulse transmitter comprising means for displaying a call number being stored or transmitted.

For reaching these objects as well as others which will become apparent in the following, the invention provides the use of a known MOS static memory, the memory being divided into tracks or set of cells in which one or more call numbers can be stored and read, and a new network arrangement for achieving the reading, writing, and addressing functions in this memory from a control keyboard comprising:

- a numerical keyboard permitting composing either the number of a track or a call number to be stored,
- a key permitting storing a number after having composed the number of a track,
- a key permitting storing a waiting period for the availability tone in the case of telephone numbers comprising a prefix,
- an "end of store" key,
- a key for permitting transmitting toward the telephone network a first number stored on a track,
- a key for permitting transmitting a second number stored on a track toward the telephone network,
- a resetting key usable at any step of the operation,
- a key giving direct access to a predetermined track allowing simultaneous storage and transmission of a call number,
- an operation control lamp,
- a storage control lamp,
- a transmission control light device for checking the transmission of a telephone number over the telephone network, any waiting period during transmission being shown by a flickering of this control light,
- a display device showing the track numbers,
- a display device showing the call number stored on the selected track.

The principles of the invention and additional objects and features thereof will be fully described in the following detailed specification of an illustrative embodiment and in the appended drawings in which:

BRIEF DESCRIPTION OF THE DRAWINGS

FIG. 4C shows in detail a portion of FIG. 4A, FIG. 7A shows a telephone availability tone detection circuit used in a memory pulse transmitter according to the invention, FIG. 7B shows voltage with respect to time characteristics for explaining the operation of the availability tone detection device according to the invention.

DESCRIPTION OF THE PREFERRED EMBODIMENTS

In the following description of a preferred embodiment in accordance with the invention, the number of memory cells, and the organization of the memory will be described using an example with specific numerical data for the sake of clarity. It will however, be clear for those skilled in the art that any modification of the memory size or organization may be effected without departing from the spirit and scope of the invention. Thus, in a preferred embodiment, the static memory of the apparatus comprises 64 tracks, that is 64 sets of memory cells, each cell making it possible to store 16 numerical digits of coded information. Thus, it is generally possible to store two telephone call numbers successively on the same track.

In order to store the call numbers on a memory track, the following operations have to be made:

selecting a track number on the key board,
depressing the "store" key,
composing any call number selected on the numerical keyboard,
depressing the "store-end" key, and in the case of storing a second call number following the first one on the same track, the following steps have to be performed:

depressing again the "store" key,
composing the second telephone call number,
depressing the "store-end" key.

For transmitting a telephone call number stored on a given track, the following steps have to be performed:

selecting on the keyboard the chosen track number,
depressing the key "emit A" or "emit B" for transmitting the first or the second call number stored on the track.

It is also possible to realize simultaneously a storage and a transmission by depressng simultaneously a store key and an "emit" key. On the other hand, when a call number comprising a prefix, after which the telephone network provides a second tone, is to be stored, this prefix is composed on the numerical keyboard and then, a "tone wait" key is depressed before composing the remaining part of the call number. In addition, according to the invention, a particularized track of the memory can be directly addressed by depressing a "store-emit" key in order that any call number stored on this track is simultaneously transmitted.

Figure 1:
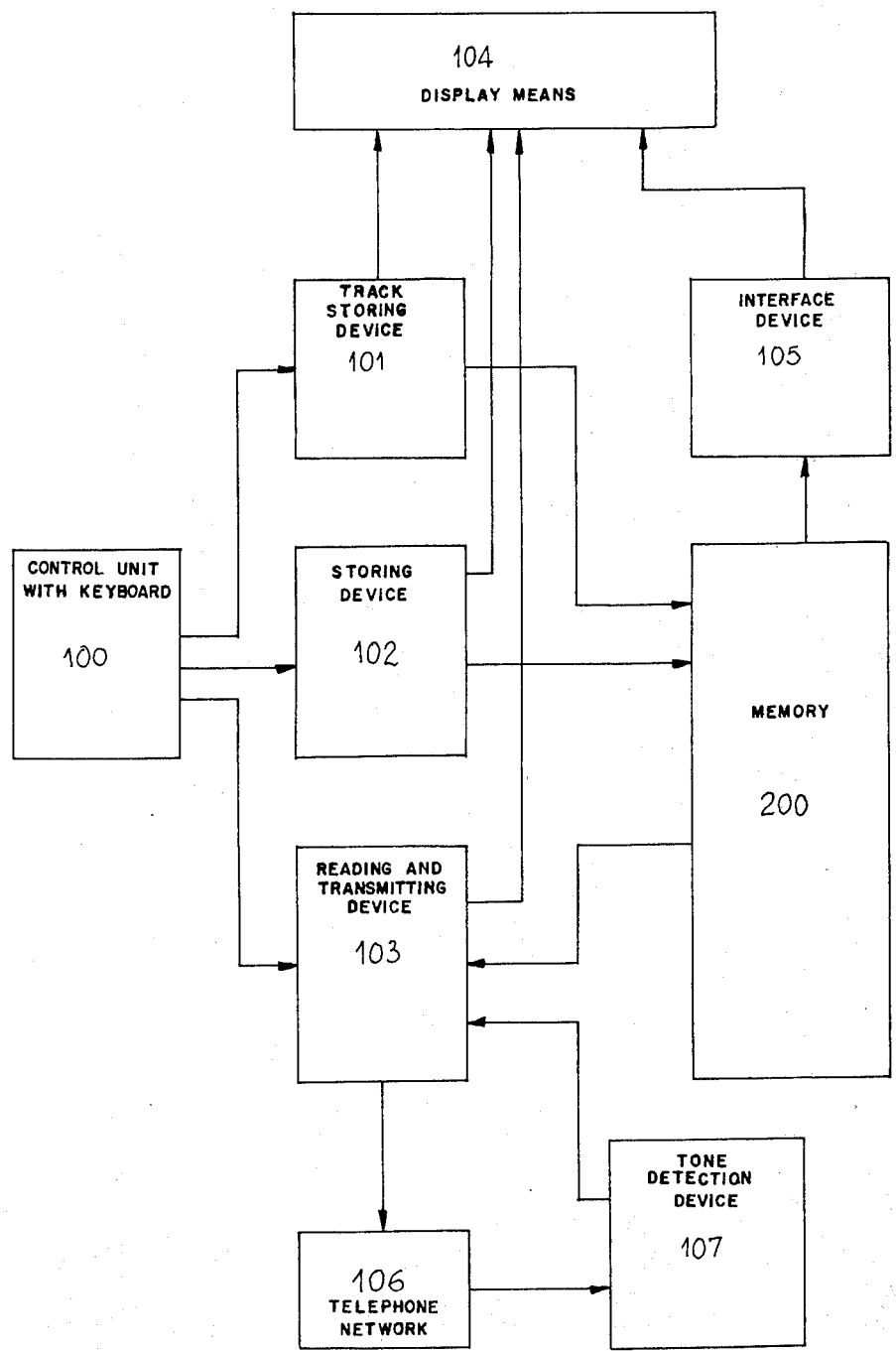
FIG. 1 is a schematic diagram of the whole memory pulse transmitter in accordance with the invention.

FIG. 1 is a schematic block diagram of the logical organization of a memory pulse transmitter according to the invention. The reference number 100 shows generally a control device comprising especially the keyboard provided with the hereinabove mentioned keys. This control device 100 is connected with a track storing device 101, a storing device 102 and a reading and transmission device 103. Those three devices 101, 102 and 103 are connected with the memory 200. A display means 104 is connected with the track storage device for displaying the number of the stored track, to the storage device and to the reading device for indicating by control lights the state of operation in which the apparatus is, and through an interface device 105, to the static memory 200 for indicating the call number(s) stored in the selected memory track.

The reading and transmission device 103 is connected with the telephone network 106, on the one hand for transmitting therein the call number stored in the selected memory track and on the other hand for receiving from the telephone line through an availability tone detection device 107 enabling signals for the transmission of a call number.

In the following, the different parts of the memory pulse transmitter according to the invention will be disclosed in relation with their operations.

I. TIMING OSCILLATOR

As it will be described later on, timing signals are necessary for the operation of the various memory, addressing, storing and reading devices.

Figure 2A:
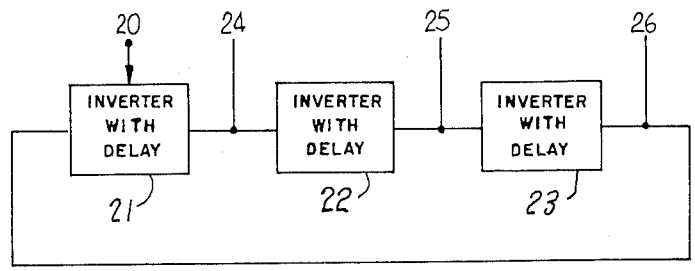
FIGS. 2A and 2B show an oscillator permitting several synchronisation functions of the memory pulse transmitter in accordance with the invention.

FIG. 2A shows generally an oscillator providing the timing signals, this oscillator being included in the control set 100 of FIG. 1. This oscillator comprises three amplifier-inverter stages provided with delay means 21, 22 and 23. Those three stages are serially connected and form a loop. The first stage can be inhibited by a signal at its terminal 20.

Figure 2B:
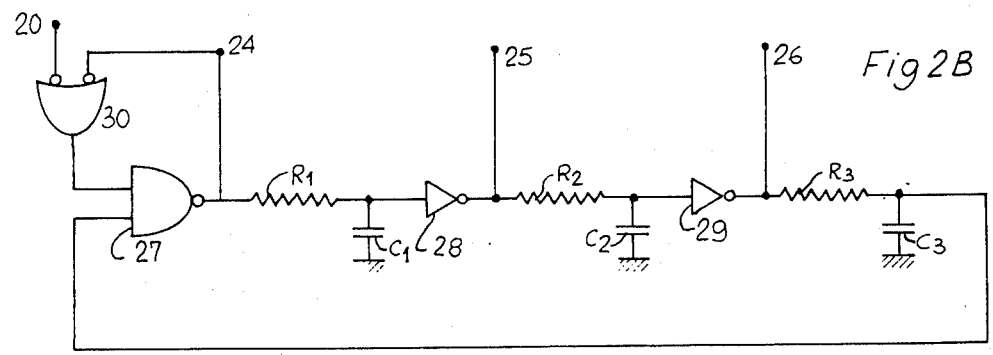

FIG. 2B shows an embodiment of the oscillator shown in block diagram in FIG. 2A. The output of a NAND gate 27 is connected with to an inverter 28 through a circuit $R_1C_1$ then to an inverter 29 through a circuit $R_2C_2$ and finally to an input of the NAND gate 27 through a circuit $R_3C_3$. The output of the NAND gate 27 is also connected through a NOR gate 30 to another input of the NAND gate 27. The other input of the NOR gate 30 is the terminal 20 which receives a control order for validating the operation of the oscillator.

Figure 3:
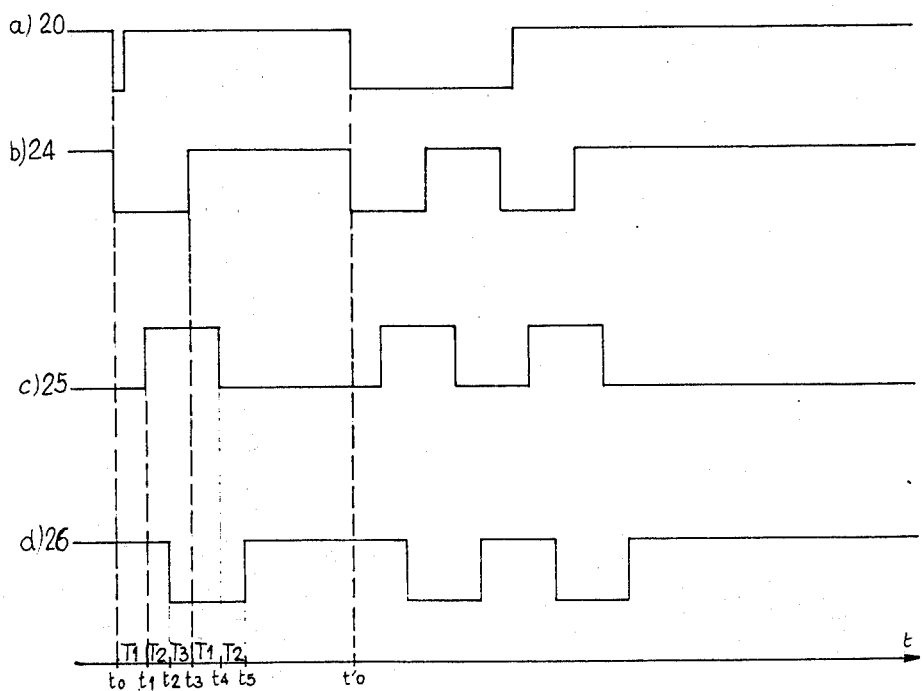
FIG. 3 is a waveform diagram of the voltage variations with respect to time at various terminals of the circuit of FIG. 2B.

The waveforms a, b, c, d of FIG. 3 show the signals at the terminals 20, 24, 25 and 26 respectively of the oscillator shown in FIG. 2. T1, T2 and T3 are the delays due to the circuits $R_1C_1$, $R_2C_2$, and $R_3C_3$ respectively. The sum T1 + T2 + T3 represents half of the oscillating period of the oscillator.

When a control pulse is provided to the terminal 20 at the time $t_0$, as shown in FIG. 3A, the oscillator operates for an oscillation cycle, that is a negative pulse is obtained at the terminal 24, a positive pulse at the terminal 25 and a negative pulse at the terminal 26. At the end of this cycle, the oscillator is stopped, the NAND gate 27 being inhibited. The pulses at the terminals 24, 25 and 26 are delayed from one another by time intervals T1 and T2. Accordingly, by means of a derivation circuit, five signals are obtained at times $t1$, $t2$, $t3$, $t4$ and $t5$ following a control signal applied at the time to. Those signals will be called hereinafter signals $t_1$, $t_2$, $t_3$, $t_4$ and $t_5$.

If, at the time $t'O$, a control order is applied to the terminal 20 during an interval equal to $2n(T1 + T2 + T3)$, the oscillator according to the invention operates during n cycles.

As will be explained later on, the signal $t_1$ corresponds to a reading or store cycle, and the signal $t_2$ to an end of storing operation or to a fast sweeping of the first call number written on a track while the second call number written on this track is read (after depressng the "emit B" key).

II. KEYBOARD CODE

Depressing the different keys of the keyboard comprised in the control set 100 will actuate elements of the apparatus, through a binary code. The code employed is indicated in the following chart by way of examples for the sake of simplicity of the description of the working of the apparatus in accordance with the invention.

CHART

| Keyboard key | code |
|---|---|
| 0 | 10000 |
| 1 | 10001 |
| 2 | 10010 |
| 3 | 10011 |
| 4 | 10100 |
| 5 | 10101 |
| 6 | 10110 |
| 7 | 10111 |
| 8 | 11000 |
| 9 | 11001 |
| emit A | 11010 |
| reset | 11011 |
| store end | 11100 |
| availability tone | 11101 |
| store | 11110 |
| store-emit track | 00000 |
| emit B | 01010 |

It will be evident for those skilled in the art that any other code comprising 5 bits or more can be used for translating the information given further to the depressing of anyone of the above listed 17 keys of the keyboard.

III. SELECTION AND STORAGE OF A TRACK

Figure 4A:
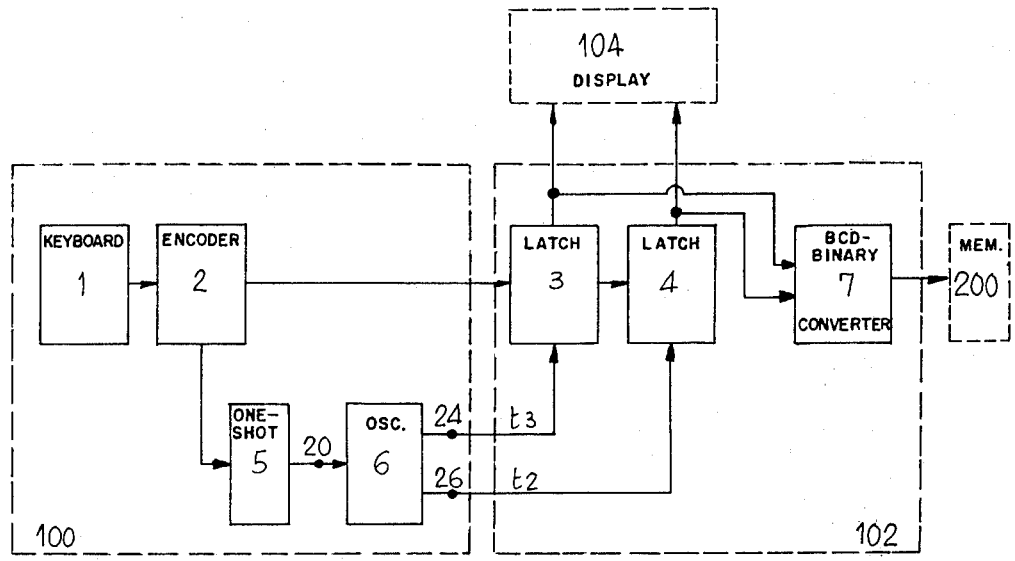
FIG. 4A is a block diagram for explaining the addressing principle of the memory according to the invention.

FIG. 4A is a schematic block diagram showing the logical device for selecting a track. It is recalled that the work "track" is used for representing a set of 16 memory cells in which one or more call numbers can be stored. Thus, selecting a track consists of choosing the address of the first of the 16 memory cells constituting a track, the other cells being then successively addressed by a counter as will be described later on.

Referring to FIG. 4A, the addressing device comprises the keyboard 1 connected with the encoding device 2, transmitting the two successive digits corresponding to the selected track number towards latch memory means 3 and 4. The transfer of the two digits constituting the track number is obtained by sending from the coding device 2, a pilot signal through a one-shot flip-flop connected with the terminal 20 of the oscillator 6 previously described with reference to FIGS. 2A, 2B and 3. The output signals $t_3$ and $t_2$ from the oscillator 6 are supplied to the latch devices 3 and 4 respectively. The code number stored in the latch devices 3 and 4 is transmitted on the one hand to the display device 104 for displaying the selected code number and, on the other hand, through a BCD-binary converter 7 to the address input of the static memory 200.

Figure 4B:
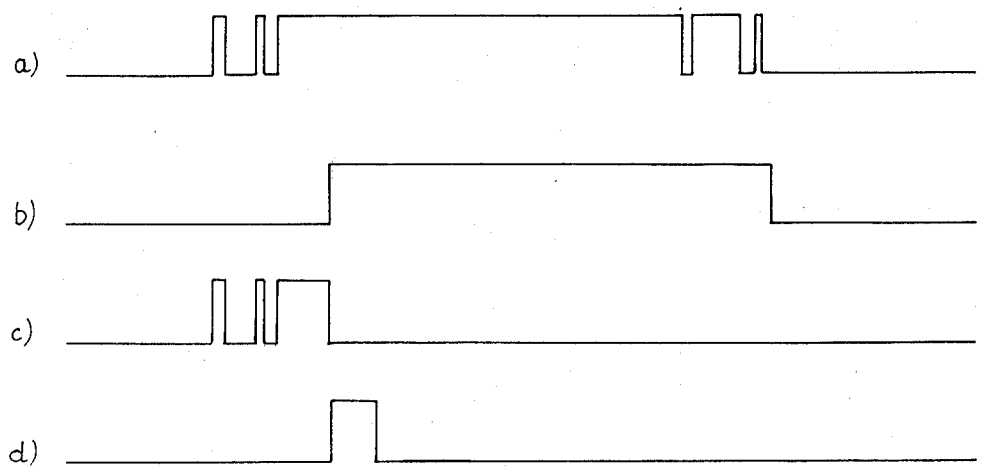
FIG. 4B is a chart of the voltages with respect to time at various terminals of the schematic diagram shown in FIG. 4A.

FIG. 4B shows the pattern of signals appearing at different terminals of the circuit of FIG. 4A. Waveform a shows the signal produced when depressing a key. This signal comprises pulses due to possible rebounds caused by depressng the key. Waveform b shows the pilot signal at the output of the coding device 2, which is integrated for avoiding the rebounds and which triggers the one-shot 5. The one-shot 5 output shown by waveform c is transmitted to the enabling input 20 of the oscillator 6, the delay time of the one-shot device being greater than the duration of one oscillator cycle. The oscillator output is shown by waveform d. The signal representing a digit corresponding to a first key depression is accordingly stored in the latch device 3, then upon a second depression of a numerical key, the contents of the latch 3 is transferred to the latch 4 and the new information is stored into in the latch 3. A seven element decoder associated with a suitable gate allows the sequential display of the selected track number by the display device 104.

The depression of the key "store-emit" gives access to a specific track allowing the simultaneous storage and transmission of a call number, said "store-emit" key permitting one clock signal to be applied on the two latches 3 and 4 which causes those latches to be reset to the value 0000. The signal $t_4$ from the oscillator permits initiation of the function of simultaneous storage and reading.

The duration of an oscillation cycle is in the range from a few microseconds to some tens of microseconds, while the minimum duration of depressing a key is measurable in the order of from a few milliseconds to some tens of milliseconds. Thus, at the time $t_3$ of the oscillator cycle, it is quite certain that the code is always present.

As is known in the art, it is possible to provide in the display device or in the BCD-binary converter 7 the output of a signal indicating that the number selected on the numerical keyboard does not correspond to any available memory addressing track, in other words, according to the numerical examples given above, that the selected number is greater than 63, this signal inhibiting the addressing operation.

IV. SELECTION OF THE STORE FUNCTION

Figure 5:
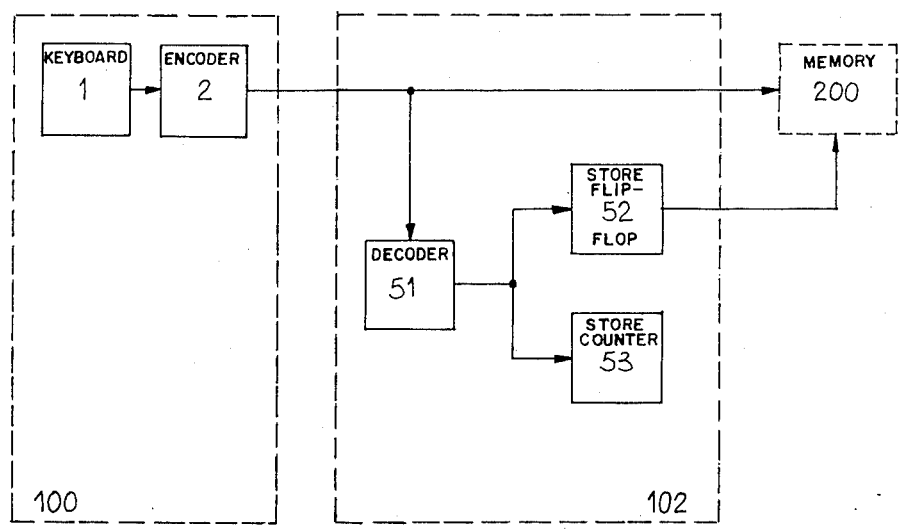
FIG. 5 is a block circuit for explaining the way in which the apparatus according to the invention is put into the storing mode.

Referring to FIG. 5, depressing the store key on the keyboard 1 causes a code 11110 to appear at the output of the encoder 2. This information is recognized by a decoder 51 which transmits a signal triggering a store flip-flop 52 connected with the memory 200 which is enabled and a store counter 53 which is also enabled. In addition, as mentioned hereinabove, the output of the store flip-flop 52 is connected with the display device 104 and energizes a control lamp indicating that the apparatus is in the storing phase.

V. STORING OF CALL NUMBER

Figure 6:
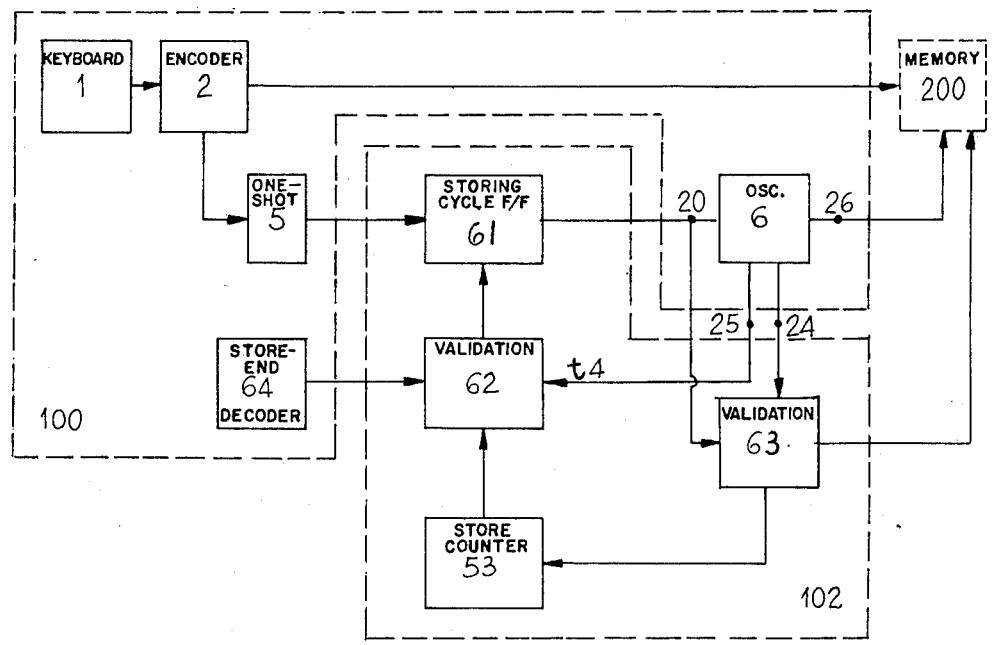
FIG. 6 is a block diagram for explaining the process of storing a call number according to the invention.

Referring to FIG. 6, the process of storing a telephone call number further to the depressing of the store key, the action of which has been described hereinbefore, will be explained. The keyboard 1, connected with the encoder 2 transmits a pilot signal to a one-shot flip-flop 5 in response to each depressing of a numerical key as this has been explained hereinbefore. The output of this one-shot flip-flop is transmitted to a storing cycle flip-flop 61, which, on the one hand enables the input 20 of the oscillator 6 and on the other hand increments by one step the storing counter 53, also shown in FIG. 5. Simultaneously, a writing order signal is transmitted from the output 26 of the oscillator 6 to the memory 200, together with a memory addressing validation signal. The blocks 62 and 63 represent logical validation circuits conventionally comprising NAND gates. The circuit 62 enables the triggering of the storing cycle flip-flop 61 in response to the signals received from the oscillator 6, from the storing counter 53 for checking whether said counter is reset or not, and from a decoder 64 indicating that the store-end key has been depressed. The validation circuit 63 enables the memory addressing and the incrementation of the counter 53 in response to signals from the output of the writing cycle flip-flop 61 and from the output 24 of the oscillator 6.

In the storing state of the apparatus, each depression of a numerical key of the keyboard 1 triggers the flip-flop 61 which causes the initiation of the oscillator 6. At the instant $t_4$ of the oscillator, this flip-flop 61 is reset. The signal from the output 24 of the oscillator together with the output signal of the flip-flop 61 are transmitted to the input of the store counter 53. This output signal enables also the outputs of this counter which are connected with the addressing input of the static memory 200. In the event that the store-end key is depressed, the signal $t_4$ is disabled preventing the writing-cycle flip-flop from being reset. The oscillator 6 works until the last counter address appears and stores into the memory a succession of codes 01101. The signal $t_4$ appearing at the output 25 of the oscillator is again enabled at the address 0 of the counter 53 and the cycle ends.

VI. AVAILABILITY TONE DETECTION CIRCUIT

Before re-transmitting on the telephone network a call number stored in the static memory 200, it is necessary to check that this telephone network is free, that is that a tone signal is present. The invention provides a new availability tone detection circuit which is especially suitable for co-operating with the other elements of the memory pulse transmitter according to the invention.

Referring to FIG. 7A, the tone detection circuit according to the invention comprises at the output of the telephone network 106 a first shaping circuit 70 for the tone signals originating from the telephone network. This first shaping circuit is connected with a second shaping circuit 71 supplying a pulse for each leading edge of the signal from the shaping circuit 70. Examples of the output signals from the shaping circuits 70 and 71 are shown by the waveforms a and b, respectively, of FIG. 7B. The pulse train shown in FIG. 7B is periodic if the signal provided on the telephone network is itself periodic. The output from the shaping circuit 71 is connected to the inputs of two recognition circuits 72 and 73. The circuit 72 supplies an output signal when the pulse frequency is lower than a given frequency (for example 1000 Hertz). The circuit 73 supplies an output signal when the pulse frequency is greater than a given frequency, (for example 300

Hertz). The outputs of the two circuits 72 and 73 are combined for supplying, through a timer circuit 74, an output signal when the input pulse frequency is between the given upper and a lower values (for example between 1000 and 300 Hertz).

The recognition circuit 72, supplying an output signal when a pulse input has a frequency lower than an upper value (1000 Hertz for example), comprises an input diode 721, an amplifier-inverter device 722, and an output diode 723 in series A capacitor 724 is connected between the input of the inverter 722 and ground, and a variable resistor 725 is connected between the input of inverter 722 and a DC supply $V_{cc}$. Thus, the capacitor 724 initially charged by the supplied source is discharged by the input pulses. If the input pulses are very close the one to another, that is if the input frequency is high, the capacitor 724 cannot be recharged between two pulses, in view of the time constant of the resistor 725-capacitor 724 network, and the inverter 722 provides no output signal. If the pulse frequency is lower, the capacitor 724 can be charged over the threshold value allowing the inverter 722 to be triggered, and an output signal is supplied by the circuit 72. Accordingly, a frequency discrimination is obtained. The choice of the cutoff frequency is determined by the variable resistor 725.

The circuit 73 comprises a series circuit including a first inverter 731, a first diode 732, a variable resistor 733, a second inverter 734 and a second diode 735. A resistor 736 is connected between the junction of the diode 732 and the resistor 733 and ground, and a capacitor 737 is connected between the junction of the resistor 733 and the second inverter 734 and ground. Thus, the capacitor 737 is charged by the input pulses and discharged through resistors 733 and 736. If the pulse frequency is too low, the capacitor 737 is fully discharged before being charged again by a next pulse. On the contrary, if the pulse frequency is high enough, greater than 300 Hertz, the charges are accumulated on the capacitor 737 and the inverter 734 is triggered.

The time delaying device 74 with which the outputs of the devices 72 and 73, which form a band-pass logical recognition device, are connected, comprises an inverter 741, the input terminal of which is connected to ground through a capacitor 743 and to a DC voltage supply $+V_{cc}$ through a resistor 742. This device is necessary for recognizing the availability tones in a telephone network in which the tones for a free line and for an occupied line are in the same frequency range and are only distinguished by the differences between their time durations.

Preferably, the amplifier-inverters used are of the CMOS type, which allows the use of high value input resistors and low value capacitors.

VII. READING OF A TELEPHONE CALL NUMBER

For setting the apparatus to the state of reading a telephone call number stored in the memory 200, either the "emit A" key which triggers two flip-flops, one of which causes a reading control lamp provided in the display device 104 to flicker and the other one enables the transmission order for the signals on the telephone network, or the "emit B" key which triggers only the flip-flop corresponding to the control lamp, has to be actuated.

Figure 8:
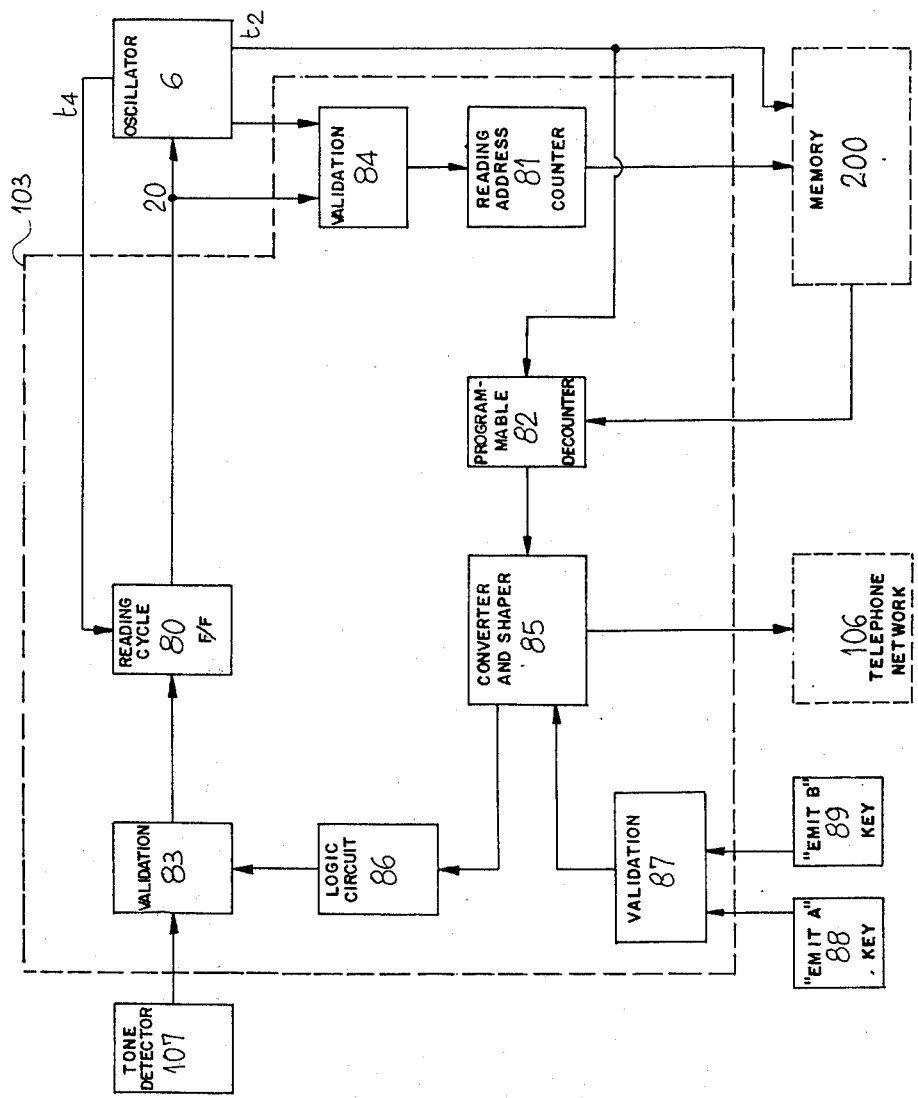
FIG. 8 is a block diagram for explaining the process for reading and transmitting a call number according to the invention.

Referring to FIG. 8, the reading circuit of the memory 200 will now be described. The essential elements of this reading circuit are a reading cycle flip-flop 80, a reading address counter 81 and a programmable decounter 82. The flip-flop 80 is switched by a tone signal from the tone detection circuit 107 above described, this signal being provided through a validation circuit 83. This output is enabled in response to the detection of the address state 0 of the reading address counter 81. The output of the flip-flop 80 is connected to the set input 20 of the oscillator 6 which is set and to a validation circuit 84 of the reading address counter 81. The output signal $t_2$ of the oscillator 6 is supplied to the actuation input of the static memory 200 and enables also the programmable decounter 82. The flip-flop 80 is reset by the output $t_4$ of the oscillator 6. Resetting of flip-flop 80 increments the reading address counter 81 by one step. The output of the information contained in each memory cell is transmitted to the programmable decounter 82 then to the telephone network 106 through a converter and shaper circuit 85 adapted to handle the stored information in accordance with the requirements of the telephone network. A logical circuit 86 detects the end of the emission of a digit from the converter and shaper circuit 85 and enables, through the validation circuit 83, a second switching of the reading cycle flip-flop 80. All the successive digits constituting a call number are accordingly read until the detection of the store-end signal (11100).

The device 85 for converting and shaping the pulses from the programmable decounter 82 is enabled by a validation circuit 87, by actuation of the "emit A" key 88 or of the "emit B" key 89. When the "emit A" key is actuated, the first cell of the selected memory track is read as this has been indicated above. When the "emit B" key is actuated, the conversion and the transmission of a number are disabled and the read address counter 81 is made to operate very quickly until a signal characteristic of the "emit B" key is recognized (01010 according to the preceding example).

In the transmission process, when the memory is actuated, the information is present at the output of the memory 200. The actuating signal of the memory is also supplied for enabling the programmable decounter 82. The programming inputs are connected with the memory outputs. The signal $t_3$ enabled by the reading cycle flip-flop 80 triggers a first one-shot flip-flop if the code of the output memory is not a store-end code (11100), tone code (11101), or a store-code (11110). At the end of the signal from this first one-shot, a second one-shot is triggered together with the counting down of the programmable decounter 82. The second one-shot is looped with the first one if the address counter 81 does not indicate 0. On the contrary, this second one-shot triggers a third one-shot flip-flop. The first and second one-shot flip-flops correspond to the telephone network pulses transmitted on the telephone line, the first corresponding to the opening instant and the second to the closing instant for example. The third one-shot corresponds to the duration between digits. The end of the signal from the third one-shot causes a new reading order to be sent. In case of reading a tone code (11101), the tone detection circuit is again enabled.

It will be understood that an oscillator connected with a counter sweeps all the memory cells corresponding to a selected track and that it produces an actuating signal for the memory in order to read the contents of the MOS memories corresponding to this track. The same counter is connected with a demultiplexor for providing a sequential display of the sixteen address cells on the display device 104.

VIII. SIMULTANEOUS STORING AND READING

As described above, the incrementing of the memory addresses is achieved for the storing by a store counter 53 and for reading by a reading counter 81. Those two counters accordingly permit two distinct addressing modes on one address track of the memory 200. However, two distinct addressings must not be produced at the same time. For this purpose, the reading and store counters are triggered by distinct signals. Each key actuation, as has been seen from the foregoing description, triggers a one-shot flip-flop 5 which triggers, after a given delay, triggers the oscillator 6, the delay time of the one-shot 5 being greater than the duration of one oscillator cycle. The validation circuits are provided in order that any reading order incoming during the delay duration of this one-shot 5 or during the duration of one oscillator cycle 6 is disabled. These reading orders will be enabled only at the end of one storing cycle. The validation conditions of the reading cycle flip-flop 80 are accordingly, in addition to the previously seen conditions, the following ones : one-shot circuit 5 not actuated, no emission on the telephone network by the circuit 85, and inequality between the store and reading counters in order that the reading orders are disabled in case the transmission of a call number would be quicker than the storing speed thereof.

IX. RESET CIRCUIT

Various means are provided for resetting the storage flip-flop 61, the reading cycle flip-flop 80, the flip-flop 87 for validating the emission on the telephone network, the writing counter 53 and the reading counter 81. Those resettings are made when the apparatus is connected to the mains; at the end of the signal supplied by the third one-shot circuit to the address 0 of the reading counter; at the time $t_4$ if the code read is an end of number code (1100); at the time $t_4$ if the read code is "emit B" code (1010); at the time $t_4$ if the read code is a tone code (1101) to the address 0 of the reading counter.

The circuit embodiments according to the invention are subject to various modifications especially as regards the provision of additional validation circuits, the provision of other display means the provision of a device disabling every superimposed storing on determined tracks, the provision of code number coding means, that is for example permitting the name of a subscriber, the code number of which is stored, to be automatically displayed. In addition, it should be emphasized again that the chosen numerical examples relating especially to the number of memory tracks and the organization of those tracks could be subjected to modifications without departing from the spirit and scope of the invention.

Moreover, it would be understood by those skilled in the art that the electronic circuits hereover disclosed are suitable for being implemented in the form of LSI circuits.

The present invention is not limited to the embodiments which have been described and other variants and modifications may be provided without departing from the scope of the invention.

What is claimed is:

1. A static memory pulse transmitter for storing coded call numbers and transmitting said coded call numbers on a telephone line comprising a static memory having a plurality of memory cells divided into a plurality of tracks, each track including a set of memory cells;

means for addressing a preselected track of said memory;

a keyboard for inserting numbers and controlling the operation of said means;

a first counter operatively associated with a track in which a call number is to be stored, said first counter being incremented in response to each actuation of a digit on said keyboard;

a second counter operatively associated with a track from which a call number is to be read, said second counter being incremented at a rate not greater than the conventional rate of dial pulses on a telephone line; and comparison means for determining that the rate of incrementing said second counter is not greater than the rate of incrementing said first counter.

2. A static memory pulse transmitter according to claim 1 and further comprising an oscillator for providing signals used for timing the addressing, the reading and the storing, said oscillator comprising three looped serial stages, each of said stages comprising delay means such as a resistor-capacitor circuit and an amplifier-inverter, the first stage of the oscillator comprising an amplifier-inverter controlled by an enabling signal whereby the oscllation train appears only when a control order is present.

3. A static memory pulse transmitter according to claim 2 wherein the reading and the storing are linked with successive cycles of the oscillator through an enabling circuit, whereby a simultaneous reading and storing addressing of the memory can be avoided.

4. A static memory pulse transmitter according to claim 1 wherein the reading of a set of memory cells containing a telephone call number to be transmitted is enabled by a signal from an availability tone detection circuit comprising:

a shaping circuit for transferring the input low frequency signals into pulse signals, a first logical circuit for recognizing whether the pulse frequency is lower than an upper value and providing a recognition signal, a second logical circuit connected in parallel with the first one for recognizing whether the pulse frequency is greater than a lower determined value and providing a recognition signal, and a timer circuit connected with an output of the first and second recognition circuits for determining that the pulse train duration is greater than a determined value.

5. A static memory pulse transmitter according to claim 4 wherein said first recognition circuit comprises a logic amplifier-inverter triggered by the discharge of a capacitor which is discharged at a quicker rate than it is charged, which relationship is established according to a predetermined time constant.

6. A static memory pulse transmitter according to claim 4 wherein said second recognition circuit comprises an inverter triggered when the charge of a capacitor by pulses to be recognized is made more quickly than if made through a predetermined time constant.

7. A static memory pulse transmitter according to claim 1 comprising a predetermined control key on said keyboard and logic circuit means actuated by said key for enabling to read the first set of digits stored on a track without transmitting same by means of an inhibition circuit of the transmitting device, and to then read and transmit the second set of digits stored on said memory track.

8. A static memory pulse transmitter according to claim 1 comprising a predetermined key on said keyboard and circuit means for selecting a predetermined track in order that the storing of a call number and its transmission are made simultaneously.

* * * * *